No. 691,841. Patented Jan. 28, 1902.
G. F. CONNER.
TOOTH FOR THRESHING MACHINES.
(Application filed Feb. 14, 1899.)
(No Model.)
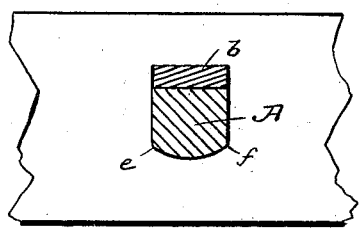
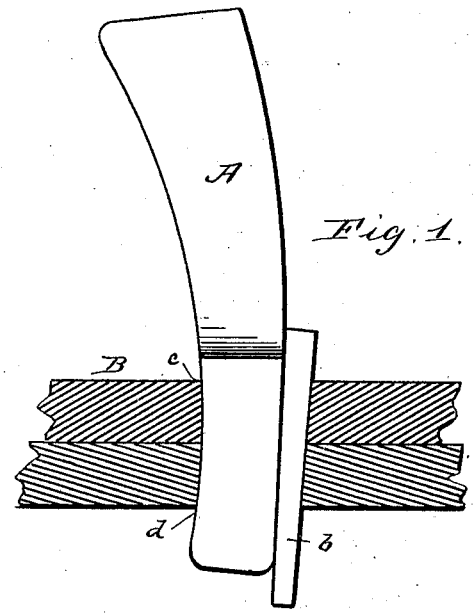
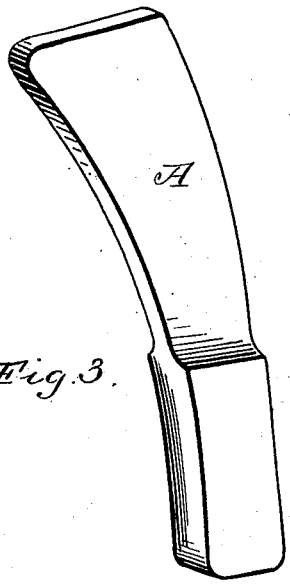
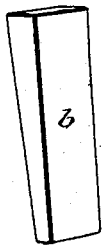
WITNESSES.
INVENTOR.
Attorney.

UNITED STATES PATENT OFFICE.

GEORGE F. CONNER, OF PORT HURON, MICHIGAN.

TOOTH FOR THRESHING-MACHINES.

SPECIFICATION forming part of Letters Patent No. 691,841, dated January 28, 1902.

Application filed February 14, 1899. Serial No. 705,471. (No model.)

*To all whom it may concern:*

Be it known that I, GEORGE F. CONNER, a citizen of the United States, residing at Port Huron, in the county of St. Clair and State of Michigan, have invented certain new and useful Improvements in Teeth for Threshing-Machines, of which the following is a specification.

My invention relates to an improvement in the design and construction and method of attachment of the teeth used in the cylinders of threshing-machines and the concaves employed in connection with said cylinders.

The object of my invention is to provide movable teeth which shall admit of easy insertion and removal and shall be firmly held in place during the operation of the machine and not liable to be jarred loose by the vibration of the machinery or severe strains to which they may be subjected. As hitherto constructed teeth for this purpose have been held in position by nuts screwed upon a threaded shank on the base of the tooth. This method of construction is objectionable, for the reasons that they are liable to become loose while the machinery is in operation and liable to injure other parts of the machinery and also dangerous to those operating the machine. It was also difficult to replace a broken tooth, often requiring the removal of the cylinder, and a difficult operation on account of the necessity of using a wrench on the inside of the cylinder or under the concave. If fastened with a nut, the shank must be practically of the same size throughout and is liable to become loose at one end or the other of the bearing, and no method is provided by the ordinary construction of tightening same.

The object of my invention is to provide a tooth adapted for use in threshing-machine cylinders and concaves which shall be easily inserted or removed without taking out the cylinder and without the use of a wrench, which shall afford a firm bearing at each end of the shank, and which shall not become loose through vibration and which if loosened from any cause can be readily tightened. I attain this object by the construction shown in the drawings, in which—

Figure 1 represents a cylinder-tooth or a tooth for the concave of a threshing-machine, the two uses being the same and my invention being adapted and designed for both cylinder or concave. Fig. 2 is the wedge or key for holding same in place; Fig. 3, a tooth in detail, and Fig. 4 shows the method of placing the tooth in the slot designed for its reception. Figs. 1 and 4 are sectional and Figs. 2 and 3 perspective views.

Similar letters refer to similar parts.

In Fig. 1, B represents the bar of the threshing cylinder or concave, the construction being the same. In the view it is shown to be double, and the slot in same for reception of tooth is seen to be constricted or smaller midway between the points $c$ and $d$. In some instances it is desirable to use a single bar, and the method of attaching my cylinder-tooth is the same. The tooth is held in position by the key $b$, driven against same. In Fig. 2 is shown the wedge of suitable size and shape, and Fig. 3 shows the cylinder-tooth. The tooth is shown to be curved at the back of the shank, the rear of said shank being convex from the points or edges $e$ to $f$. In Fig. 4 it is seen that this curved or convex shank brings the bearing of the tooth against the center of the curved slot at the rear, and by this means any irregularity in the cutting of the slot does not affect the bearing of the tooth. In Fig. 1 the rear of the shank is shown to curve inward from $c$ to $d$, thus giving the tooth a bearing at the extreme outer edge of the bars B, and the slot being constricted in the center gives it also a bearing at the center of the bars. It will thus be seen that the shank or holding portion of the tooth is smallest in diameter at a point intermediate the ends of the hole in the bar B or between the points $c$ and $d$ and that the diameter increases longitudinally each way, so that the shank is, in effect, a double wedge and will tend to tighten in the hole by force tending to move the tooth either in or out. There is consequently no liability of the tooth working loose, the tendency being rather to tighten always. The effect would not be the same if the holding portion of the shank were straight. When it is desired to remove the tooth, a few blows upon the bottom of the wedge $b$ releases the wedge, and the tooth can be withdrawn.

What I claim as my invention, and desire to protect by Letters Patent, is—

1. The combination with a threshing-cylinder bar having a hole therein, of a tooth comprising a threshing portion and a shank or holding portion located in the hole which shank portion is of less diameter intermediate the ends than at its opposite ends, and a wedge between the shank and one side of the hole and extending longitudinally of the shank, substantially as described.

2. The combination with a threshing-cylinder bar having a hole therein, of a tooth having a shank or holding portion one side of which shank is longitudinally concaved and the opposite side of which shank is straight, and a wedge between the straight side of the shank and one side of the hole, substantially as described.

3. The combination with a threshing-cylinder bar having a hole therein one side of which is transversely concaved, of a tooth having a shank or holding portion located in the hole which shank is of less diameter intermediate the ends than at its opposite ends, one side of said shank being transversely convexed, and a wedge between the opposite straight side of the shank and one side of the hole, substantially as described.

4. The combination with a threshing-cylinder bar, having a hole therein, one side of which is longitudinally concaved and also transversely concaved, of a tooth having a shank or holding portion in said hole, one side of said shank being longitudinally concaved and transversely convexed, and a wedge between the opposite straight side of the shank and one side of the hole, substantially as described.

5. A tooth for threshing-machines provided with a threshing portion and a shank or holding portion, which shank portion has a substantially straight side and an opposite side longitudinally inbent or concaved intermediate its ends and transversely convexed, substantially as described.

6. A tooth for a threshing-machine cylinder consisting of a blade portion, and a shank portion curved inwardly from the blade to at or near its opposite end and convexed in cross-section on its rear edge, substantially as described.

7. The combination with a threshing-cylinder bar having an opening therein formed with a curved concaved wall and an opposite straight wall, of a tooth having the rear edge of its shank fashioned to fit the curved wall of the opening, and curved outward longitudinally and a wedge interposed directly between the front edge of the tooth-shank and the straight wall of the opening, substantially as described.

8. A tooth for threshing-machines consisting of a blade portion and a shank portion which latter portion has one edge recessed inwardly from at or near its opposite ends to form oppositely-disposed wedge-like portions and the shank having a substantially straight edge opposite the recessed edge, substantially as described.

In testimony whereof I affix my signature in presence of two witnesses.

GEORGE F. CONNER.

Witnesses:
H. B. HOYT,
C. A. HARRINGTON.